United States Patent Office 3,360,507
Patented Dec. 26, 1967

3,360,507
AZO DYESTUFFS CONTAINING α,α-BIS(TRIFLUO-ROMETHYL) BENZYL ALCOHOL GROUPS
Willis A. Fisher, Snyder, and Russell I. Steiner, Williamsville, N.Y., assignors to Allied Chemical Corporation, New York, N.Y., a corporation of New York
No Drawing. Filed Dec. 3, 1964, Ser. No. 415,800
25 Claims. (Cl. 260—147)

ABSTRACT OF THE DISCLOSURE

Azo dyes, characterized in general by good fastness to washing, which correspond to the formula:

$$Q-(Z)_n$$

wherein Q is a residue of an azo dyestuff, n is a whole number from 1 to 2 and Z is a substituent attached to an aromatic nucleus present in Q and Z corresponding to the structure

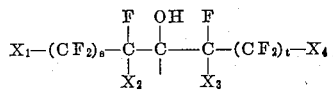

wherein $X_1$, $X_2$, $X_3$ and $X_4$ are halogens of atomic weight 9 to 35 and s and t are integers 0 to 1. The azo dyes may contain, in addition to the above described group Z other substituents such as hydroxy, carboxy, sulfo, alkyl, alkoxy, sulfamyl and sulfonyl, for example. The dyes may also contain metallizable groups such as arylhydroxy and carboxy bound in positions adjacent to an azo bridge, which groups can be in complex combination with a metal of atomic weight 50 to 66, particularly copper or nickel. The dyes are prepared in known manner, i.e., by coupling a diazotizable amine and coupling component wherein either the amine or the coupling compound or both contains the group Z. The azo dyes are washfast and include water-soluble acid dyes for wool and nylon, water-soluble direct dyes for super polyamide and other synthetic fibers. The metalliferous water insoluble azo dyes produce strong, washfast colorations on super polyamide fiber characterized by good fastness to light, dry cleaning, crocking and resistance to gas fading.

---

The present invention relates to novel azo dyestuffs. More particularly, it relates to novel azo dyestuffs which correspond to the structure $$Q-(Z)_n$$

wherein Q is the residue of an azo dyestuff, n is a whole number from 1 to 2 and Z is a substituent attached to an aromatic nucleus present in Q, said Z corresponding to the structure

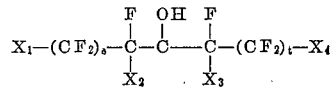

wherein $X_1$, $X_2$, $X_3$ and $X_4$ are halogens of atomic number 9 to 35, i.e. fluorine, chlorine or bromine and s and t are integers 0 to 1.

Dyestuffs of the foregoing structure color fabrics in attractive shades characterized in general by good fastness to washing.

The dyestuff residue which is represented by Q in the above structural formula may be derived from any monoazo or polyazo dyestuff containing at least one aromatic residue. In addition to the substituent Z described above, the residue Q may contain a variety of substituents for example sulfonic acid groups, carboxylic acid groups, sulfonic acid amide groups which may be N-mono- or disubstituted; alkyl, alkoxy and sulfonyl (—SO$_2$—)-alkyl groups particularly those containing up to 4 carbon atoms; aryl groups for example phenyl or naphthyl groups, nitro groups; and halogen atoms, e.g. fluorine, chlorine and bromine. The dyestuff may contain metallizable groups such as o,o'-dihydroxyazo, o-hydroxy-o'-carboxyazo, o-hydroxy-carboxy, e.g. salicyl groups, etc., which groups can be, if desired, in complex combination with a metal of atomic weight 50 to 66 particularly copper or nickel. The present novel structures include both water-insoluble and water-soluble dyestuffs, for example dyes rendered water-soluble by presence of one or more sulfonic acid substituents.

The mono- and polyazo dyes of the invention are prepared in a manner well known to the azo dyestuff art by coupling a diazotizable amine with a coupling component wherein either the diazo compound or one coupling compound or both contains the aforementioned group Z. Suitable diazotizable amines containing Z can be prepared by the method described in U.S. patent application Ser. No. 329,889, assigned to this assignee. Suitable coupling components substituted with Z can be prepared in accordance with the methods disclosed in French Patent 1,325,-204 and U.S. patent application Ser. No. 327,520, also assigned to this assignee.

Typical amines which can be employed in preparing the novel dyestuffs include:

p-amino-α,α-bis(trifluoromethyl)benzyl alcohol
2-amino-4-nitrobenzenesulfonic acid
sulfanilic acid
metanilic acid
4-aminonaphthalene sulfonic acid
3-amino-1,5-naphthalenedisulfonic acid
6-amino-1,3-naphthalenedisulfonic acid
p-toluidine
4-amino-3,5-dimethyl-α,α-bis(chlorodifluoromethyl) benzyl alcohol
p-amino-α,α-bis(chlorodifluoromethyl) benzyl alcohol
4-amino-2-chloro-α,α-bis(trifluoromethyl)benzyl alcohol
4,4'-diamino-2,2'-stilbenedisulfonic acid
2-amino-α,α-bis(trifluoromethyl)-4-biphenyl methanol
4-amino-2-methyl-α,α-bis(chlorodifluoromethyl) benzyl alcohol
4-amino-3-methoxy-α,α-bis(trifluoromethyl) benzyl alcohol
4-amino-3-hydroxy-α,α-bis(trifluoromethyl) benzyl alcohol
4-amino-3-carboxy-α,α-bis(trifluoromethyl) benzyl alcohol
5-nitro-2-aminophenol
4-nitro-o-anisidine
5-nitroanthranilic acid
5-chloro-o-anisidine
3,5-dibromoanthranilic acid
4,6-dichloroanthranilic acid
p-aminophenol
o-aminophenol
4-nitro-2-aminophenol
2-ethoxyaniline
aniline Coupling components which can be used for preparing the novel dyes of invention include the following representative examples:

2-naphthol-3,6-disulfonic acid
1-hydroxy-α,α-bis(trifluoromethyl)-2-naphthalenemethanol
1,5-dihydroxy-α,α,α',α'-tetrakis(trifluoromethyl)-2,6-naphthalenedimethanol
1,5-dihydroxy-α,α,α',α'-tetrakis(chlorodifluoromethyl)-2,6-naphthalenedimethanol
1,5-dihydroxy-α,α-bis(chlorodifluoromethyl)-2-naphthalenemethanol 6,6'-ureylene bis(1-naphthol-3-sulfonic acid)
2-hydroxy-α,α-bis(chlorodifluoromethyl)benzyl alcohol
acetoacetanilide
5-pyrazolone
phenol
3-methyl-5-pyrazolone
1-phenyl-3-methyl-5-pyrazolone
1-(2-chlorophenyl)-3-methyl-5-pyrazolone
1-(3-nitrophenyl)-3-methyl-5-pyrazolone
1-(3-sulfamylphenyl)-3-methyl-5-pyrazolone
p-cresol
resorcinol
β-naphthol
5-chloro-1-naphthol
p-chlorophenol
2,4-dihydroxy-α,α-bis(trifluoromethyl)benzyl alcohol Metalliferous dyestuffs contemplated by the present invention can be readily prepared by treating unmetallized dyes of the invention containing metallizable groups by known methods with an agent yielding a metal of atomic weight 50 to 66, and particularly copper or nickel, e.g. an acetate, sulfate, acetylacetonate, formate, or like salt of the metal, in the presence of an organic solvent, for example diethylene glycol, dimethyl formamide, glycerine, ethoxyethanol ("Cellosolve") and the monoethyl ether of diethylene glycol ("Carbitol"). Conveniently, metallization is carried out using a metal acetate in dimethyl formamide.

The novel water soluble dyestuffs of this invention include direct dyes for coloring cotton as well as acid dyes for coloring wool and nylon according to conventional dyeing techniques.

Metallized as well as unmetallized water-insoluble dyes of the invention can be used to dye synthetic hydrophobic fibers e.g. superpolyamide fiber, Dacron, cellulose acetate and the like according to the well known disperse dyeing techniques wherein the color is applied to the fiber from aqueous dispersions obtained with the aid of dispersing agents, e.g. sodium lignosulfonate, waste sulfate liquor, a formaldehyde condensation product of an alkyl naphthalene sulfonate, or a formaldehyde condensation product of a naphthalene β-sulfonate.

Water-insoluble metalliferous monoazo dyes of the invention constitute a particularly valuable class of dyes which color superpolyamide fibers e.g. poly ε-caprolactam (Nylon 6), polyhexamethylene adipamide (Nylon 6,6), polyundecamide (Nylon 11) and polyhexamethylene sebacamide (Nylon 610) from aqueous dye baths in heavy shades which possess good wash fastness, excellent levelness, fastness to light, dry cleaning, and crocking, and resistance to gas fading.

The following examples illustrate the preparation and application of the novel dyes of the invention but it is to be understood that the invention is not to be limited by the specific details of these examples, since, as will be obvious to those skilled in the art, changes can be made in these details without departing from the scope or spirit of the invention. The temperatures are in degrees centigrade and parts and percentages are by weight.

EXAMPLE 1

A. *Coupling*

A solution of 50.6 parts (0.175 mol) of 4-amino-3-methoxy-α,α-bis(trifluoromethyl) benzyl alcohol prepared as described in U.S. patent application Serial No. 329,889, in a mixture of 52.5 parts water and 51 parts 20° Bé. hydrochloric acid was cooled to about 0°. Over a period of about 5 minutes a 4 N aqueous solution containing 12.6 parts (0.175 mol) sodium nitrite was added to the mixture which was maintained at a temperature of 0–5° during the addition. On completion of the addition, the mass was agitated for 30 minutes at 0–5°. The resulting diazonium salt solution was added over a period of about 45 minutes to 21 parts (0.194 mol) of p-cresol dissolved in a mixture of 350 parts of water, 139 parts 50° Bé. sodium hydroxide and 52.5 parts of sodium carbonate. The coupling mass was heated to 40° and filtered. The filter cake was washed free of alkali and inorganic salts with 4000 parts of water and dried in air at 70–75°. The yield of α,α-bis(trifluoromethyl)-3-methoxy-4-(2-hydroxy-5-methylphenylazo) benzyl alcohol was 68.5 parts (0.168 mol 96% of theory).

B. *Metallation*

The monoazo dyestuff of Part A was charged to 2000 parts of dimethyl formamide and heated to 120°. Cupric acetate monohydrate (40 parts 0.2 mol) was charged and the mixture was heated at about 155° for about 16 hours. The reaction was cooled to ambient temperature, drowned in 6000 parts of water, agitated for 2 hours and filtered. The filter cake obtained was washed with water until the effluent wash liquor was colorless. The wet product (368 parts) containing 73.6 parts (dry weight, 92.5% of theory) of the metallized dyestuff of the structure

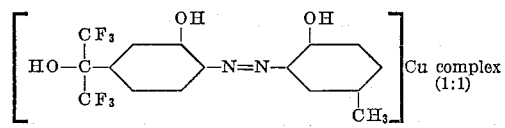

was sand ground with 37 parts of formaldehyde-naphthalene p-sulfonic acid condensation product (Tamol N) and 37 parts of lignin sulfonate (Marasperse N) and spray dried. The resulting dyestuff composition dispersed in water, dyed Nylon 6 and Nylon 6,6 in attractive bluish-red shades of excellent levelness, fastness to light, washing, crocking and dry cleaning and resistance to gas fading.

EXAMPLE 2

In a manner according to that described in Example 1, Part A, 13.8 parts (0.05 mol) of 4-amino-3-hydroxy-α,α-bis(trifluoromethyl) benzyl alcohol was diazotized in aqueous medium and coupled into 20.8 parts (0.082 mol) of 1-(3-sulfamylphenyl)-3-methylpyrazolone to obtain 22.4 parts (83% of theory) of the dyestuff

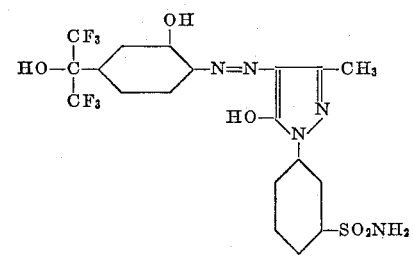

The above dye dispersed in water provided level bright yellow colorations on cellulose acetate.

The 1:1 copper complex of the above dye prepared in accordance with method of Example 1, Part B, dyed Nylon 6,6 and Nylon 6, yellow-brown shades of excellent levelness and fastness to light, washing and dry cleaning.

EXAMPLES 3–4

In the following examples set forth in Table I, unmetallized monoazo dyestuffs were prepared from the amines and coupling components listed by a method according to that described in Example 1, Part A. The corresponding metal derivatives of the dyestuffs were prepared in accordance with the procedure of Example 1, Part B.

TABLE I

| Example | Amine | Coupling Component | Shade of Dyeing of Unmetallized Dye | Metallized Dye | Shade of Dyeing of Metallized Dye |
|---|---|---|---|---|---|
| 3 | 4-nitro-o-anisidine | 2,4-dihydroxy-α,α-bis(trifluoromethyl)benzyl alcohol. | | Cu (1:1) | Violet on Nylon 6 and Nylon 6,6. |
| 4 | 4-amino-3-hydroxy-α,α-bis(trifluoromethyl) benzyl alcohol. | β-naphthol | Orange on Dacron. | Cu (1:1) | Bluish red on Nylon 6 and Nylon 6,6. |

EXAMPLE 5

The following example illustrated the dyeing of Nylon 6,6 and Nylon 6 with the metallized dyestuff of Example 1.

About 0.5 part of the copper containing dye of Example 1 was pasted with 1 part of a 10% aqueous solution of an alkyl polyether alcohol (Triton X–67) and the resulting mixture was diluted with sufficient water at 90° to provide 500 parts of aqueous dispersion.

Nylon 6,6 tricot (10 parts) was immersed for 20 minutes in a bath at 40° containing 344 parts of water, 2 parts of a 10% aqueous solution of a sodium sulfate of a fatty acid ester (Tetranol) and 4 parts of a 10% aqueous solution of ammonium sulfate. The fiber was withdrawn and 50 parts of the aqueous dye dispersion were charged. The fiber was immersed in the dye bath for 20 minutes at 40° with frequent agitation. Over a period of 45 minutes the bath was heated to 95° and maintained at that temperature for 45 minutes. The goods were withdrawn, rinsed with water at ambient temperature and dried. A 10 part sample of Nylon 6 tricot was dyed in like manner. The Nylon 6,6 and Nylon 6 samples were dyed in attractive bluish-red shades characterized by excellent levelness, fastness to light, wet processing and crocking as well as high resistance to gas fading. The dyeings obtained were superior in build-up of color and fastness to light, washing and crocking, to similar dyeings obtained on Nylon 6,6 and Nylon 6 using the copper complex of the product obtained by coupling o-anisidine into p-cresol.

EXAMPLE 6

In a manner analogous to that described in Example 1, Part A, 0.13 part (0.05 mol) of 4-amino-α,α-bis(trifluoromethyl) benzyl alcohol was diazotized in aqueous medium. Over a period of 30 minutes the aqueous diazonium salt was added to an agitated mixture of 19.1 parts (0.055 part) of 2-naphthol-3,6-disulfonic acid, disodium salt, 397 parts of 50% aqueous sodium hydroxide, 15 parts sodium carbonate and 300 parts of water maintained at a temperature of 0–5°. Upon the completion of the addition the coupling mass was agitated for 15 minutes at 0–5° and heated to 80°. Sodium chloride (60 parts) was added and the mixture was cooled to 40–45°. The precipitated orange solid was recovered by filtration, washed with 53.5 parts of 10% aqueous sodium chloride and dried at 70°. The product corresponding to the structure

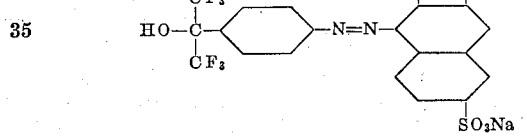

was obtained in excellent yield, and dyes wool and nylon from an acid bath in bright heavy orange shades, characterized by excellent fastness to light and washing.

EXAMPLES 7–17

In the following examples presented in Table II monazo acid dyestuffs were prepared from the amines and coupling components listed according to the method described in Example 6.

TABLE II

| Example | Amine | Coupling Component | Shade of Dyeing Wool Dyeing |
|---|---|---|---|
| 7 | 2-amino 5-nitrobenzene sulfonic acid. | 1-hydroxy-α,α-bis (trifluoromethyl)-2-naphthalene-methanol. | Brown from sulfuric acid bath; violet from acetic acid bath. |
| 8 | Sulfanilic acid | do | Scarlet-orange. |
| 9 | Naphthionic acid | do | Red. |
| 10 | Sulfanilic acid | 1, 5-dihydroxy-α,α,α',α'-tetrakis (trifluoromethyl)-2,6-naphthalene dimethanol. | Bordeaux. |
| 11 | 4-aminonaphthalene sulfonic acid | do | Violet. |
| 12 | s-amino-1,5-naphthalene disulfonic acid. | Same as Example 7 | Orange-red. |
| 13 | 5-amino-1,3-naphthalene disulfonic acid. | do | Do |
| 14 | 3-amino-1,5-naphthalene disulfonic acid. | Same as Example 10 | Violet. |
| 15 | 6-amino-1,3-naphthalene disulfonic acid. | do | Do. |
| 16 | Metanilic acid | 1, 5-dihydroxy-α,α,α',α'-tetrakis (chlorodifluoromethyl)-2, 6-naphthalenedimethanol. | Deep bordeaux red. |
| 17 | do | 1, 5-dihydroxy-α,α,-bis(chlorodifluoromethyl)-2-naphthalene-methanol. | Do. |

EXAMPLES 18–20

In the following examples set forth in Table III water-insoluble, non-metallized monoazodyestuffs were prepared from the amines and coupling components listed, according to the procedure described in Example 1, Part A. These disperse dyes colored the synthetic fibers listed in the table in attractive shades, of good fastness to light and washing.

TABLE III

| Ex. | Amine | Coupling Component | Shade of Dyeing |
|---|---|---|---|
| 18 | 4-amino-α,α-bis (trifluoromethyl) benzyl alcohol). | Phenol | Yellow on cellulose. |
| 19 | p-toluidine | Same as Example 16. | Bordeaux on nylon. |
| 20 | ____do____ | Same as Example 17. | Deep red on nylon. |

EXAMPLE 21

According to the procedure described in Example 6, 13 parts (0.05 mol) of 4-amino-α,α-bis(trifluoromethyl) benzyl alcohol were diazotized and coupled into 13.8 parts (0.027 mol) of 6,6'-ureylenebis-1-naphthol-3-sulfonic acid in aqueous medium to obtain an excellent yield of the disazo dye corresponding to the structure

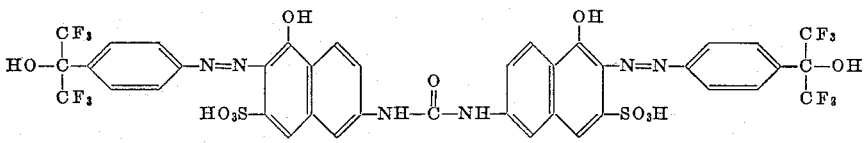

which dyed cotton in orange shades.

EXAMPLE 22

By a procedure according to that described in Example 21, 4,4'-diamino-2,7'-stilbene disulfonic acid was diazotized and coupled with two molar equivalents of 2-hydroxy-α,α-bis(chlorodifluoromethyl)benzyl alcohol to produce a good yield of a yellow dye for cotton.

We claim:
1. An azo dyestuff of the structure

$$Q—(Z)_n$$

wherein Q is a residue of an azo dyestuff containing at least one aromatic residue which may contain one or more substituents selected from the group consisting of sulfonic acid, carboxylic acid, sulfonic acid amide, alkyl, alkoxy, sulfonyl alkyl, aryl, nitro and hydroxy or a halogen atom which may be fluorine, chlorine or bromine, n is a whole number from 1 to 2 and Z is a substituent directly attached to a carbon atom of an aromatic nucleus present in Q, said Z corresponding to the structure

wherein $X_1$, $X_2$, $X_3$ and $X_4$ are each fluorine, chlorine or bromine, and s and t are integers 0 to 1.

2. A metal complex derivative of an azo dye having the structural formula $$[Q—(Z)_n]M$$

wherein M is a metal having an atomic weight between 50 and 66, Q is the residue of an azo dyestuff as defined in claim 1 and containing a metallizable group, and $(Z)_n$ is as in claim 1.

3.

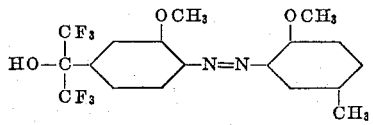

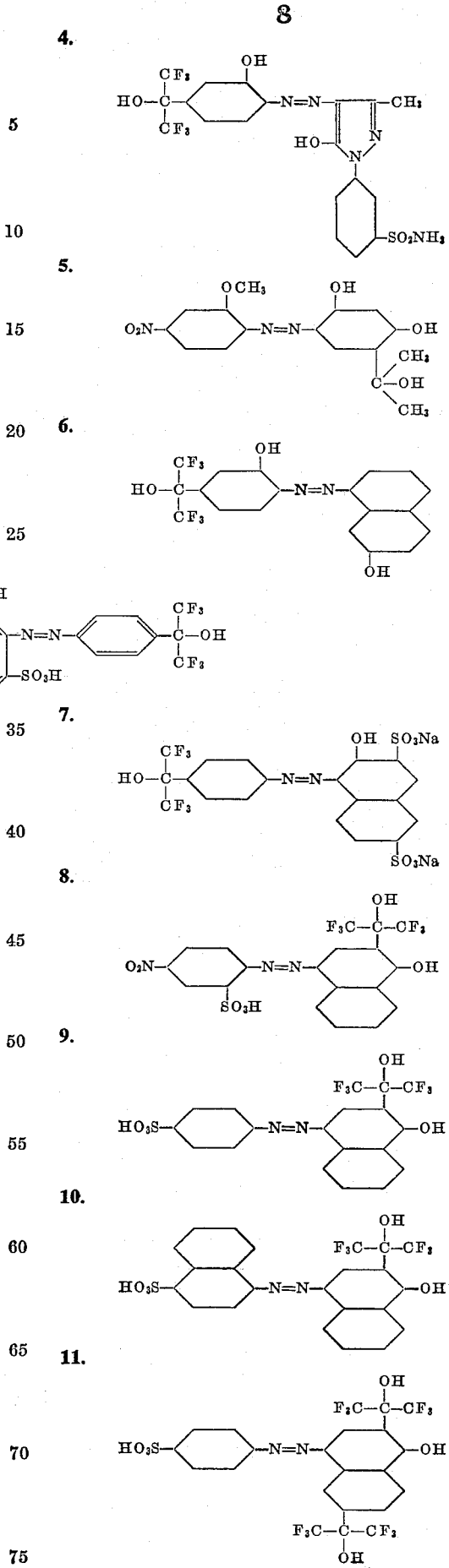

12.
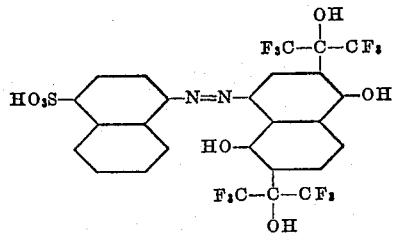

13.
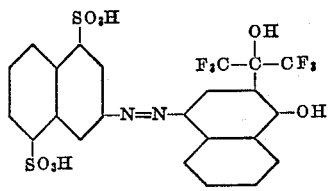

14.
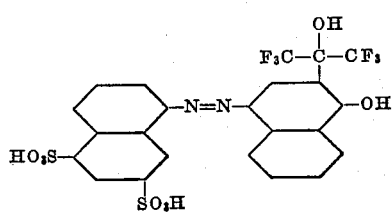

15.
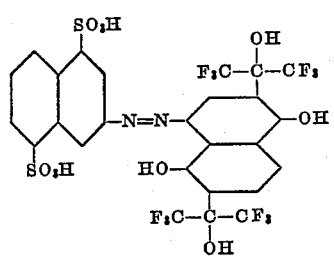

16.
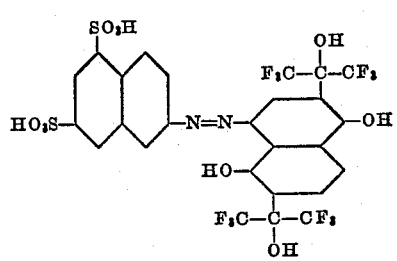

17.
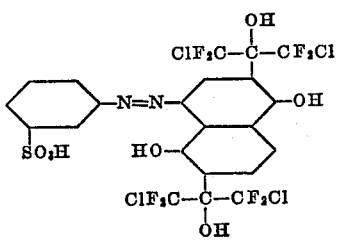

18.
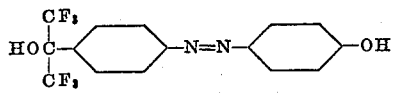

19.
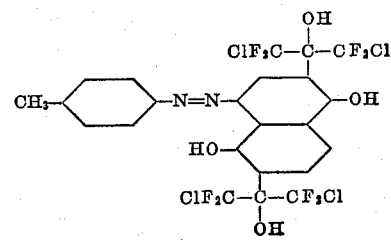

20.
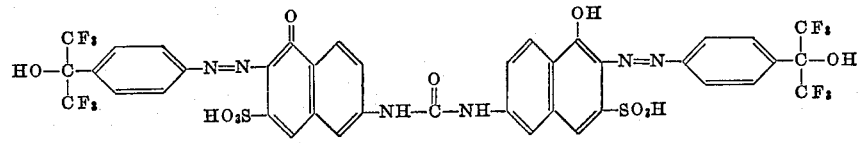

21. A copper complex derivative of an azo dye having the structural formula

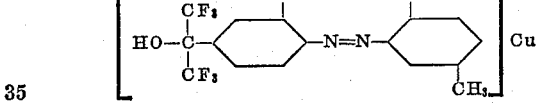

22. A copper complex derivative of an azo dye having the structural formula

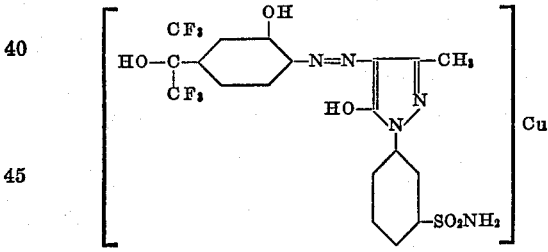

23. A copper complex derivative of an azo dye having the structural formula

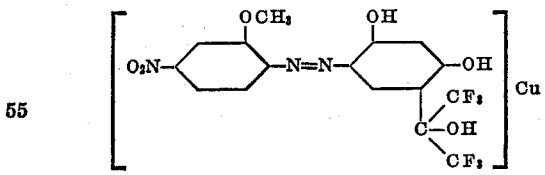

24. A copper complex derivative of an azo dye having the structural formula

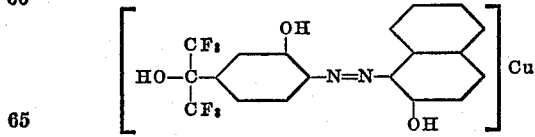

25. The azodyestuff obtained by coupling diazotized metanilic acid into 1,5-dihydroxy α,α-bis(chlorodifluoromethyl)2-naphthalene methanol.

References Cited

UNITED STATES PATENTS 2,700,686  1/1955  Dickey et al. _____ 260—196 X

FLOYD D. HIGEL, *Primary Examiner.*

UNITED STATES PATENT OFFICE
CERTIFICATE OF CORRECTION

Patent No. 3,360,507 December 26, 1967

Willis A. Fisher et al.

It is hereby certified that error appears in the above numbered patent requiring correction and that the said Letters Patent should read as corrected below.

Columns 5 and 6, Table II, second column, opposite Example 12, for "s-amino-1,5-" read -- 3-amino-1,5- --; column 7, lines 70 to 75, the formula should appear as shown below instead of as in the patent:

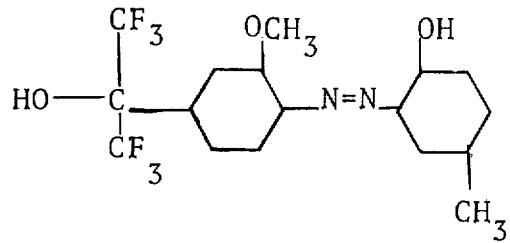

column 8, claim 5, the formula should appear as shown below instead of as in the patent:

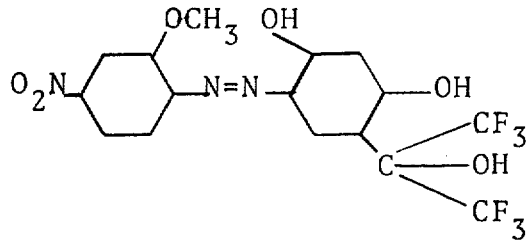

same column 8, claim 11, the formula should appear as shown below instead of as in the patent:

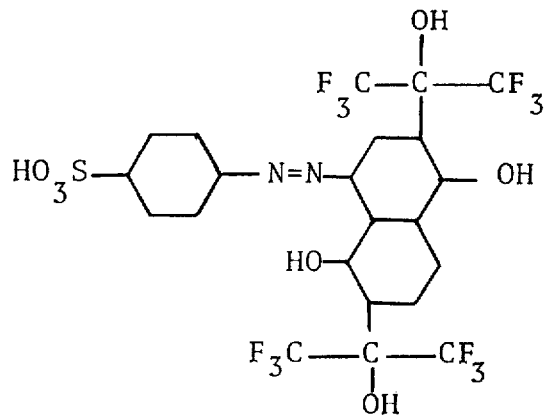

columns 10 and 11, claim 20, the formula should appear as shown below instead of as in the patent:

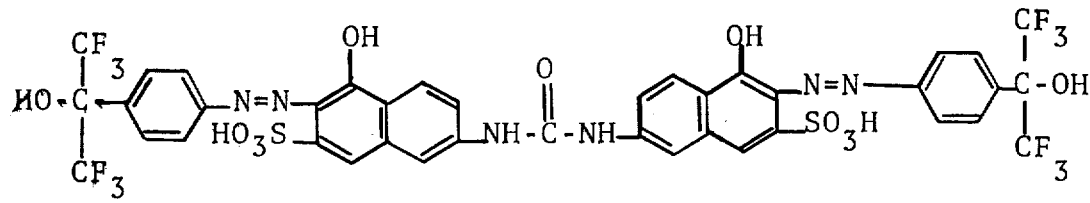

Signed and sealed this 22nd day of April 1969.

(SEAL)
Attest:

EDWARD M. FLETCHER, JR.
Attesting Officer

EDWARD J. BRENNER
Commissioner of Patents